United States Patent
Lin et al.

(10) Patent No.: US 12,299,369 B2
(45) Date of Patent: May 13, 2025

(54) SYSTEMS AND METHODS OF ESTIMATING THERMAL PROPERTIES OF SEMICONDUCTOR DEVICES

(71) Applicant: Taiwan Semiconductor Manufacturing Company, Ltd., Hsinchu (TW)

(72) Inventors: Ching-Yi Lin, Zhubei (TW); Fong-yuan Chang, Hsinchu County (TW); Po-Yu Chen, Baoshan Township (TW); Po-Hsiang Huang, Tainan (TW); Chih-Wei Chang, Hsinchu (TW); Jyh Chwen Frank Lee, Palo Alto, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 583 days.

(21) Appl. No.: 17/669,652

(22) Filed: Feb. 11, 2022

(65) Prior Publication Data

US 2023/0117009 A1     Apr. 20, 2023

Related U.S. Application Data

(60) Provisional application No. 63/257,049, filed on Oct. 18, 2021.

(51) Int. Cl.
*G06F 30/392*     (2020.01)
*G06F 119/08*     (2020.01)

(52) U.S. Cl.
CPC ........ *G06F 30/392* (2020.01); *G06F 2119/08* (2020.01)

(58) Field of Classification Search
CPC ........................... G06F 30/392; G06F 2119/08
(Continued)

(56) References Cited

U.S. PATENT DOCUMENTS

2006/0095493 A1*   5/2006   Kumano ............... G01N 25/18
                                                                         708/490
2009/0079424 A1*   3/2009   Tralshawala ....... G01N 27/9046
                                                                         324/222
(Continued)

FOREIGN PATENT DOCUMENTS

DE     10 2006 059 829 A1     6/2008
KR     1020180028044 A     3/2018
(Continued)

OTHER PUBLICATIONS

Office Action issued in connection with German Appl. No. 102022103355.4 dated Mar. 13, 2024.
(Continued)

*Primary Examiner* — Jack Chiang
*Assistant Examiner* — Suchin Parihar
(74) *Attorney, Agent, or Firm* — FOLEY & LARDNER LLP

(57) ABSTRACT

A method includes: receiving a layout of an integrated circuit; identifying, based on the layout, at least a first net and at least a second net, wherein the first net extends through the integrated circuit along a vertical direction, and the second net terminates at a middle portion of the integrated circuit along the vertical direction; dividing the integrated circuit into a plurality of grid units, wherein the first net is constituted by a first subset of the plurality of grid units, and the second net is constituted by a second subset of the plurality of grid units; estimating a first thermal conductivity of each of the first subsets of grid units; estimating a second thermal conductivity of each of the second subsets of grid units; and estimating an equivalent thermal conductivity of the integrated circuit based on combining the first thermal conductivity and the second thermal conductivity.

20 Claims, 10 Drawing Sheets

(58) Field of Classification Search
USPC .......................................................... 716/111
See application file for complete search history.

(56) References Cited

U.S. PATENT DOCUMENTS

| | | | |
|---|---|---|---|
| 2009/0269584 A1* | 10/2009 | Bell | ........................ H10N 10/01 |
| | | | 264/435 |
| 2009/0319964 A1* | 12/2009 | Kariat | ................... G06F 30/367 |
| | | | 716/136 |
| 2016/0203246 A1 | 7/2016 | Chiou et al. | |
| 2018/0075176 A1 | 3/2018 | Yasutake | |
| 2019/0132955 A1* | 5/2019 | Blais | ..................... H05K 1/0209 |
| 2022/0034829 A1* | 2/2022 | Yokoyama | .............. G01N 25/18 |
| 2024/0119211 A1* | 4/2024 | Lee | ......................... G06F 30/23 |

FOREIGN PATENT DOCUMENTS

| | | |
|---|---|---|
| KR | 1020210110187 A | 9/2021 |
| TW | I468446 B | 1/2015 |
| TW | 201924000 A | 6/2019 |
| TW | I678632 B | 12/2019 |

OTHER PUBLICATIONS

Taiwan Office Action issued in connection with TW Appl. Ser. No. 111113109 dated Dec. 29, 2022, without English translation (7 pages).
Office Action issued in connection with Korean Appl. No. 10-2022-0044647 dated Mar. 29, 2024.

\* cited by examiner

SYSTEMS AND METHODS OF ESTIMATING THERMAL PROPERTIES OF SEMICONDUCTOR DEVICES

CROSS-REFERENCE TO RELATED APPLICATION

This application claims priority to and the benefit of U.S. Provisional Application No. 63/257,049, filed Oct. 18, 2021, entitled "AN EFFECTIVE EQUIVALENT THERMAL CONDUCTIVITY CALCULATION METHODOLOGY CONSIDERING CONNECTIVITY BETWEEN METAL LAYERS," which is incorporated herein by reference in its entirety for all purposes.

BACKGROUND

Thermal analysis of an integrated circuit is often performed in design and/or manufacturing stage of the integrated circuit. Through the thermal analysis, one or more temperature-related profiles (e.g., a temperature gradient, a heat distribution, a temperature map, etc.) of the integrated circuit may be determined, and hence it may be found whether the resulting integrated circuit meets design specification or not. This ensures that the integrated circuit is not overheated, for example.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
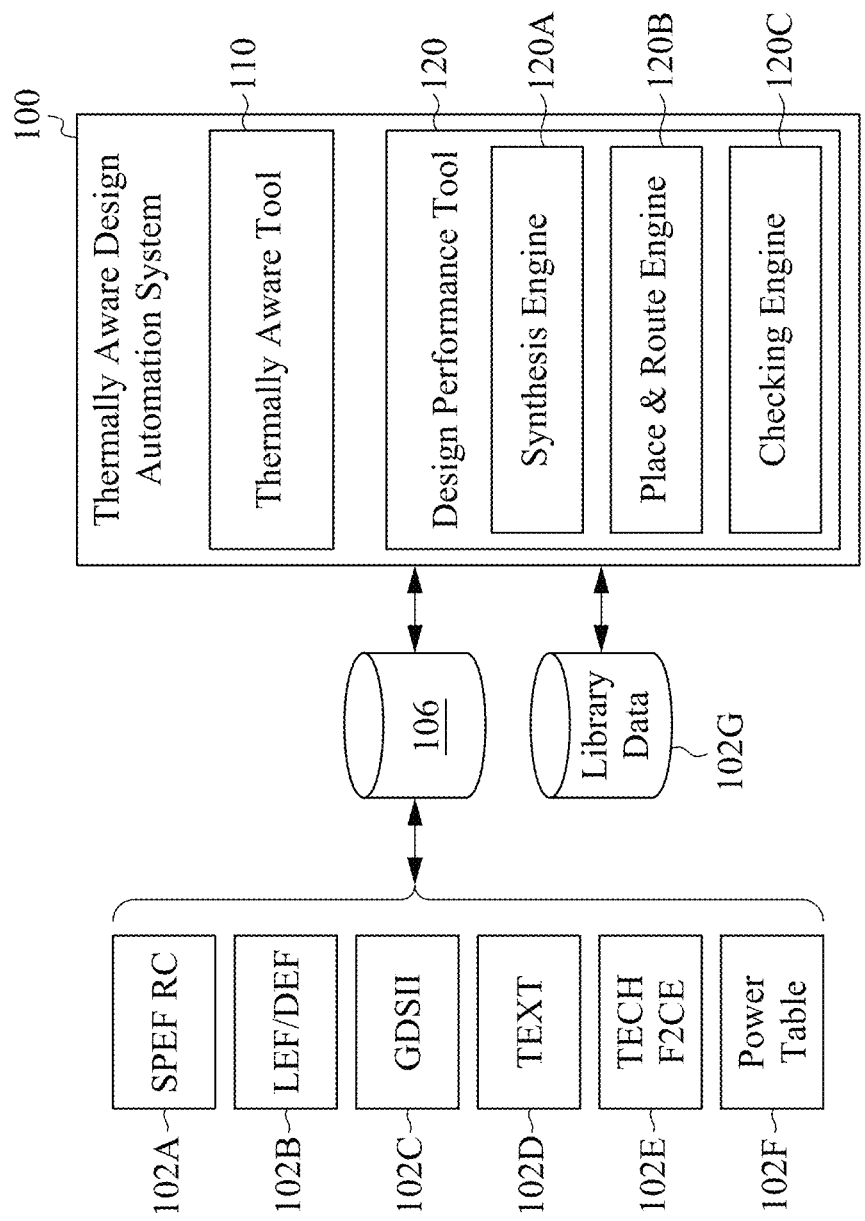
FIG. 1 illustrates a block diagram of selected components and operational environment elements of a thermally aware design automation system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, an integrated circuit package includes one or more integrated circuits (e.g., each formed as a chip or on a die) with interconnect structures of each of the chips, between the chips, between the chips and packages, and between the packages and a printed circuit board. The interconnect structures may be placed in a vertical plane, horizontal plane or angular plane. The integrated circuit package is built in accordance with one or more of various descriptions, such as hardware description languages, circuit netlists, mask layer descriptions, layout databases, package architectures, heatsink specifications, mechanical and electrical component descriptions, material stacks, topologies and properties, thermal management system specifications, semiconductor chip-package system specification which may include description of component chips and their interconnections.

Conventionally, when the thermal analysis of an integrated circuit package is preformed, the structure and the properties of the components in the package are collected. For example, when a package includes a package substrate, an interposer, a die, and a heat sink, the thicknesses, the power maps, the materials, and the stacking of these components are collected. Next, the package is divided into a plurality of gird units, sometimes referred to as finite elements. An equivalent thermal conductivity of the package is calculated via combining a respective thermal conductivity of each grid unit that is roughly estimated based on its corresponding material density (e.g., the density of a metal material). This equivalent thermal conductivity can then be (e.g., analytically) used to obtain one or more temperate-related profiles of the package.

However, given the ever increasingly complicated design of current integrated circuit, this conventional approach may oversimplify the equivalent thermal conductivity of an integrated circuit (or integrated circuit package). For example, solely relying on the metal density of the grid unit can overestimate its thermal conductivity, as not each of the grid units is constructed along a "feedthrough net" of the integrated circuit for heat propagation. In the present disclosure, the term "feedthrough net" may refer to a (e.g., electrical) connection net or path that originates from a heat source and fully extends through the integrated circuit. Accordingly, the term "non-feedthrough net" may refer to a (e.g., electrical) connection net or path that originates from a heat source and terminates at an intermediate portion of the integrated circuit. When the grid unit(s) constructed along a non-feedthrough net are improperly treated as part of a feedthrough net (by solely relying on their respective densities), the thermal conductivity of each of such grid units is overestimated. Stated another way, these grid units may actually present a poorer (e.g., lower) thermal conductivity. Such an overestimated thermal conductivity (in turn, an overestimated equivalent thermal conductivity of the whole package) can disadvantageously result in underestimating temperatures at some portions of the package. In turn, potential high temperature issues at such portions of the package cannot be identified through the conventional thermal analysis approaches.

The present disclosure provides various embodiments of systems and methods to accurately and effectively estimate an equivalent thermal conductivity of an integrated circuit (or an integrated circuit package). In some embodiments, a thermal analysis tool of the system, as disclosed herein, can identify a number of feedthrough nets and a number of non-feedthrough nets of an integrated circuit based on a design of the integrated circuit. For each of the feedthrough nets, the thermal analysis tool can generate a number of first grid units constructing the feedthrough net; and for each of the non-feedthrough nets, the thermal analysis tool can generate a number of second grid units constructing the non-feedthrough net. The disclosed thermal analysis tool can then separately estimate the respective thermal conductivities of the first grid units and the respective thermal conductivities of the second grid units. By separating the feedthrough and non-feedthrough nets and respectively estimating the thermal conductivities of the grid units that construct those different nets, the disclosed thermal analysis tool can accurately and effectively estimate an equivalent thermal conductivity of the integrated circuit. Further, some portions of the integrated circuit that can generate relatively higher heat can be accurately identified, which allows the potential overheated issues to be identified at a relatively earlier design stage. Consequently, the design of the integrated circuit can be optimized prior to actually fabricating the integrated circuit, which can significantly lower the corresponding resources and time.

FIG. 1 illustrates a block diagram of selected components and operational environment elements of a thermally aware design automation system 100, according to various embodiments of the present disclosure. The thermally aware design automation system 100 is configured to receive a number of inputs 102A, 102B, 102C, 102D, 102E, 102F, and 102G (hereinafter collectively referred to as "inputs 102") and process these inputs 102 to produce a full-chip (e.g., three-dimensional) thermal analysis of the proposed design of a semiconductor chip. In various embodiments of the present disclosure, the semiconductor chip, as used herein, includes a die of an integrated circuit or multiple such dies integrated as an integrated circuit package. However, it should be appreciated that the semiconductor chip may be implemented as any of various other semiconductor devices, while remaining within the scope of the present disclosure.

The inputs 102 include industry standard design data 102A-102F (e.g., pertaining to the physical chip design or layout under consideration) and library data 102G (e.g., pertaining to the semiconductor devices and interconnects incorporated in the design). The industry standard design data optionally includes one or more of the following types of data: electrical component extraction data and extracted parasitic data (e.g., embodied in SPEFs 102A), design representations including layout data (e.g., embodied in LEF/DEF files 102B, GDSII files 102C, and/or text files 102D), manufacturer-specific techfiles 102E describing layer information and package models, and user-generated power tables 102F including design data. For example, the design data includes switching factor information such as E(sw). In another example, the design data includes power source information used by transient thermal analysis. In some embodiments, industry standard design data 102A-102F is stored in a design database 106 such as an open access database or a proprietary database. In some embodiments, the library data 102G is embodied in a library that is distributed by a semiconductor part manufacturer or a library vendor. In other embodiments, the library incorporating the library data 102G is built in-house by a user.

The thermally aware design automation system 100 includes a thermal analysis tool (or engine) 110 and a design/performance tool (or engine) 120. In brief overview, the thermal analysis tool 110 is configured to perform a full-chip thermal analysis of a semiconductor chip under design. For example, the thermal analysis tool 110 can identify a number of feedthrough nets and a number of non-feedthrough nets across the design of a semiconductor chip, construct each of the feedthrough nets and non-feedthrough nets with a respective number of grid units, and perform a thermal analysis on the semiconductor chip based on those grid units. The thermal analysis is one or more of a static thermal analysis and a transient thermal analysis. In some embodiments, results of the thermal analysis can be used to improve and/or repair the design of the semiconductor chip (that is being designed).

The design/performance tool 120 can optionally include engines (software sub-systems, e.g. as callable tasks and procedures) for providing layout, physical design, and verification services. In some embodiments, an included verification service has a circuit simulator that is capable of interfacing to a thermal analysis tool (e.g., 110). Further, the design/performance tool 120 includes synthesis engine 120A, place & route engine 120B, and checking engine 120C for performing synthesis, place and route, and various design checks (such as ERC, DRC, and timing checks), respectively.

For example, the synthesis engine 120A can create a functionally equivalent (e.g., logic gate-level) circuit description, such as a netlist. The synthesis engine 120A can form the functionally equivalent circuit description based on the inputs 102. Once the synthesis engine 120A creates the functionally equivalent circuit description, the place & route engine 120B can create a physical layout of the semiconductor chip being designed based on the inputs 102. Once the place & route engine 120B finishes generating the physical layout for the semiconductor chip, the checking engine 120C can check whether the various (e.g., timing, design rules, etc.) constraints specified in the inputs 102 are met. The checking engine 120C may perform such an analysis by performing one or more simulations using circuit simulators, e.g. Simulation Program with Integrated Circuit Emphasis (SPICE).

In various embodiments, the thermal analysis tool 110 and design/performance tool 120 are configured to intercommunicate with each other to optimize the design of a semiconductor chip. For example, upon the thermal analysis tool 110 performing a thermal analysis on the original design of a semiconductor chip, the thermal analysis tool 110 may identify one or more temperature-related issues based on the original design. In response to identifying such temperature-related issues (and corresponding positions), the thermal analysis tool 110 can communicate with the design/performance tool 120 to automatically modify or otherwise update the design, for example, modifying a portion of the layout of the semiconductor chip that corresponds to the positions where the temperature-related issues occur. In some alternative or additional embodiments, upon the issues being identified, the thermal analysis tool 110 may interface with the user to allow the design to be manually modified.

Figure 2:
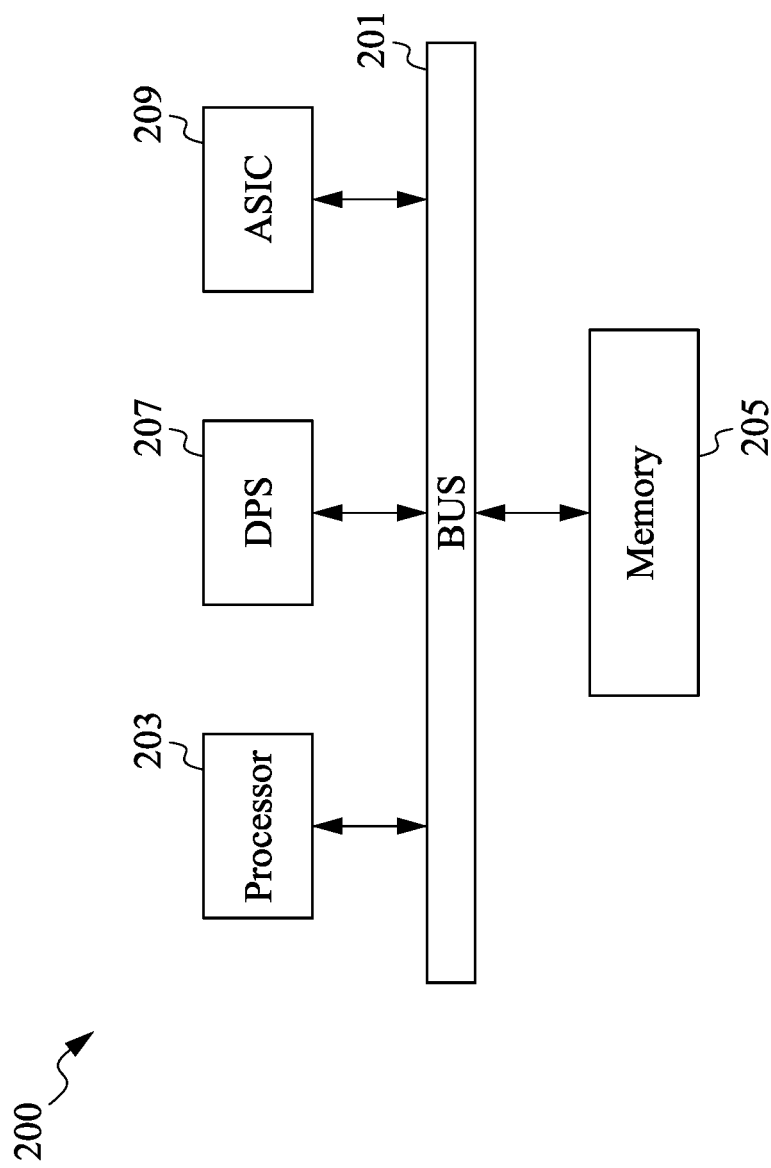
FIG. 2 illustrates a computing system upon which or by which the thermally aware design automation system of FIG. 1 is implemented, in accordance with some embodiments.

FIG. 2 illustrates a computing system 200 upon which or by which one or more embodiments of the present disclosure (e.g., the thermally aware design automation system 100) is implemented. As shown, the computing system 200 includes, for example, bus 201, processor 203, memory 205, DSP 207 and ASIC 209 components.

The processor 203 and memory 205 are incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing system 200 is implemented in a single chip. It is further contemplated that in certain embodiments the computing system 200 is implemented as a single "system on a chip." It is further contemplated that in certain embodiments a separate ASIC would not be used, for example, and that all relevant functions as disclosed herein would be performed by a processor or processors, e.g., processor 203. The computing system 200, or a portion thereof, constitutes a mechanism for performing one or more steps/operations of performing a thermal analysis on the design of an integrated circuit and optionally updating the design based on results of the thermal analysis.

The computing system 200 includes a communication mechanism such as bus 201 for passing information among the components of the computing system 200. The processor 203 has connectivity to the bus 201 to execute instructions and process information stored in, for example, the memory 205. In some embodiments, the processor 203 is also accompanied with one or more specialized components to perform certain processing functions and tasks such as one or more digital signal processors (DSP) 207, or one or more application-specific integrated circuits (ASIC) 209. A DSP 207 typically is configured to process real-world signals (e.g., sound) in real time independently of the processor 203. Similarly, an ASIC 209 is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

The processor (or multiple processors) 203 performs a set of operations on information as specified by computer program code related to performing a thermal analysis on the design of an integrated circuit and optionally updating the design based on results of the thermal analysis. The computer program code is a set of instructions or statements providing instructions for the operation of the processor and/or the computer system to perform specified functions.

The processor 203 and accompanying components have connectivity to the memory 205 via the bus 201. The memory 205 includes one or more of dynamic memory (e.g., RAM, magnetic disk, writable optical disk, etc.) and static memory (e.g., ROM, CD-ROM, etc.) for storing executable instructions that when executed perform the steps described herein to perform a thermal analysis on the design of an integrated circuit and optionally update the design based on results of the thermal analysis. The memory 205 also stores the data associated with or generated by the execution of the steps.

In one or more embodiments, the memory 205, such as a random access memory (RAM) or any other dynamic storage device, stores information including processor instructions for performing a thermal analysis on the design of an integrated circuit and optionally updating the design based on results of the thermal analysis. Dynamic memory allows information stored therein to be changed by the thermally aware design automation system 100. RAM allows a unit of information stored at a location called a memory address to be stored and retrieved independently of information at neighboring addresses. The memory 205 is also used by the processor 203 to store temporary values during execution of processor instructions. In various embodiments, the memory 205 is a read only memory (ROM) or any other static storage device coupled to the bus 201 for storing static information, including instructions, that is not changed by the thermally aware design automation system 100. Some memory is composed of volatile storage that loses the information stored thereon when power is lost. In some embodiments, the memory 205 is a non-volatile (persistent) storage device, such as a magnetic disk, optical disk or flash card, for storing information, including instructions, that persists even when the thermally aware design automation system 100 is turned off or otherwise loses power.

The term "computer-readable medium" as used herein refers to any medium that participates in providing information to processor 203, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, or another medium from which a computer can read. The term computer-readable storage medium is used herein to refer to a computer-readable medium.

Figure 3:
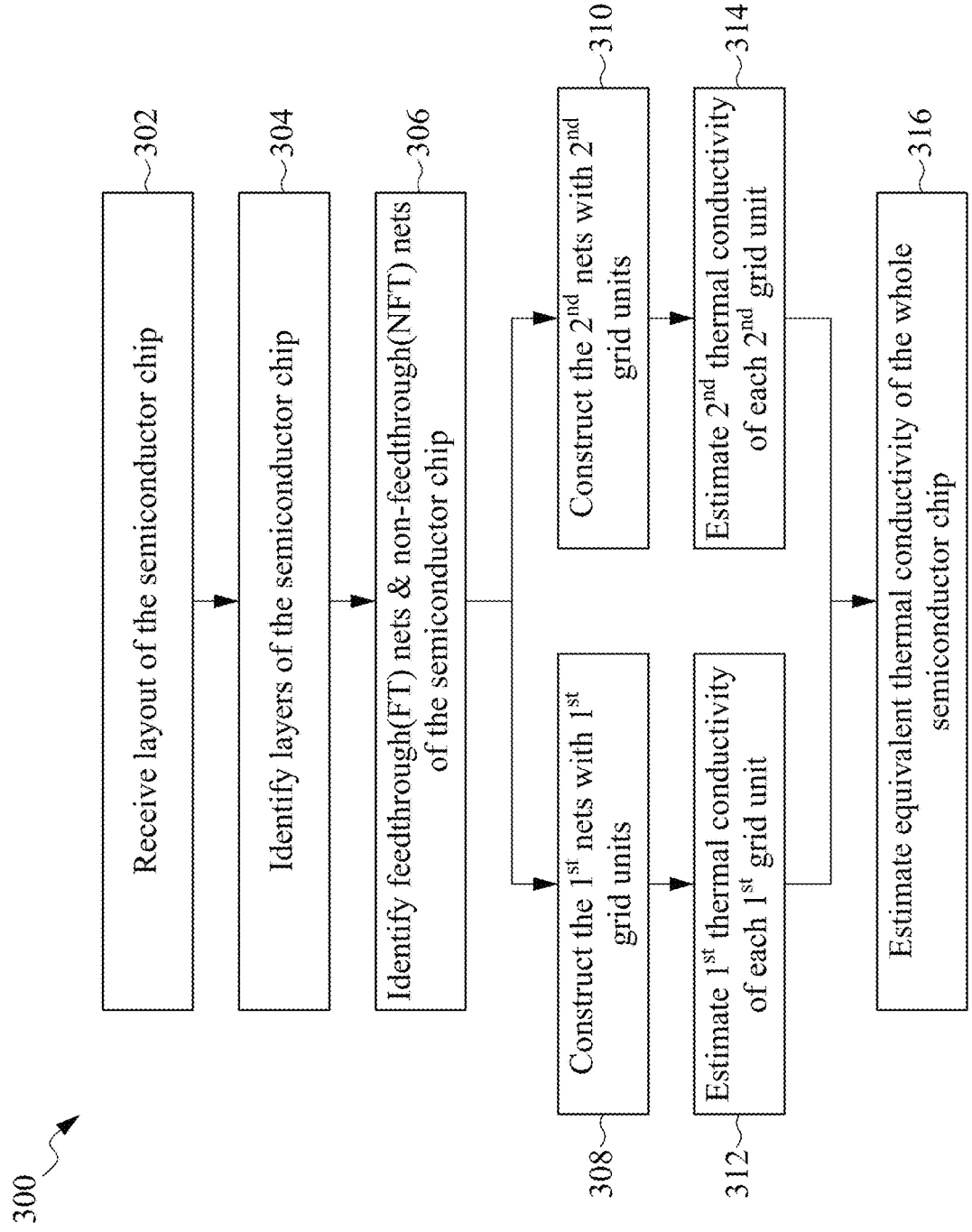
FIG. 3 illustrates a flow chart of a method for performing a thermal analysis on a semiconductor chip, in accordance with some embodiments.

Referring to FIG. 3, depicted is a flow chart of a method 300 to perform a thermal analysis on a semiconductor chip based on a physical layout of the semiconductor chip, in accordance with various embodiments. The operations of the method 300 can be performed by one or more components illustrated of the thermally aware design automation system 100 in FIG. 1. For purposes of discussion, the following embodiment of the method 300 will be described in conjunction with FIG. 1, and non-limiting examples of FIGS. 4 through 10. The illustrated embodiment of the method 300 is merely an example. Therefore, it should be understood that any of a variety of operations may be omitted, re-sequenced, and/or added while remaining within the scope of the present disclosure.

In brief overview, the method 300 starts with operation 302 of receiving a layout of a semiconductor chip. The method 300 proceeds to operation 304 of identifying a number of layers of the semiconductor chip. The method 300 proceeds to operation 306 of identifying a number of feedthrough nets and a number of non-feedthrough nets of the semiconductor chip. Next, the method 300 proceeds to operation 308 of constructing each feedthrough net with a number of first grid units. Also in response to operation 306, the method 300 proceeds to operation 310 of constructing each non-feedthrough net with a number of second grid units. Following operation 308, the method 300 proceeds to operation 312 of estimating a first thermal conductivity of each of the first grid units, and following operation 310, the method 300 proceeds to operation 314 of estimating a second thermal conductivity of each of the second grid units. In response to both operations 312 and 314, the method 300 proceeds to operation 316 of estimating an equivalent thermal conductivity of the whole semiconductor chip based on the first thermal conductivity and second thermal conductivity.

Referring first to operation 302, the synthesis engine 120A and place & route engine 120B (FIG. 1) can collectively generate the layout of a semiconductor chip (e.g., 400 of FIG. 4) based on the inputs 102. For example, such an initial layout is generated based on behavioral/functional design and design constraints specified in the inputs 102A-F using cells from the library data 102G. Upon generating the layout, the design/performance tool 120 that has the synthesis engine 120A and place & route engine 120B (FIG. 1) can provide the layout to the thermal analysis tool 110 (FIG. 1). Upon receiving the layout, the thermal analysis tool 110 can perform at least one thermal analysis on the semiconductor chip (e.g., a temperature distribution of the semiconductor chip, a temperature difference across the semiconductor chip, etc.) and, if needed, communicate with the design/performance tool 120 to modify or otherwise update the initial layout, which will be discussed as follows.

Next, in operation 304, the thermal analysis tool 110 can identify a number of layers of the semiconductor chip. In various embodiments, based on the received layout, the thermal analysis tool 110 can divide the semiconductor chip into a number of (e.g., horizontal) layers stacked on top of one another along a vertical direction (e.g., the Z axis). In some embodiments, each of such horizontal layers can correspond to a physical layer of the semiconductor chip, which includes a group of interconnect structures laterally (e.g., along the X axis and the Y axis) spaced from each other but disposed within a certain dielectric layer (e.g., an inter metal dielectric (IMD) or an interlayer dielectric (ILD)).

Figure 4:
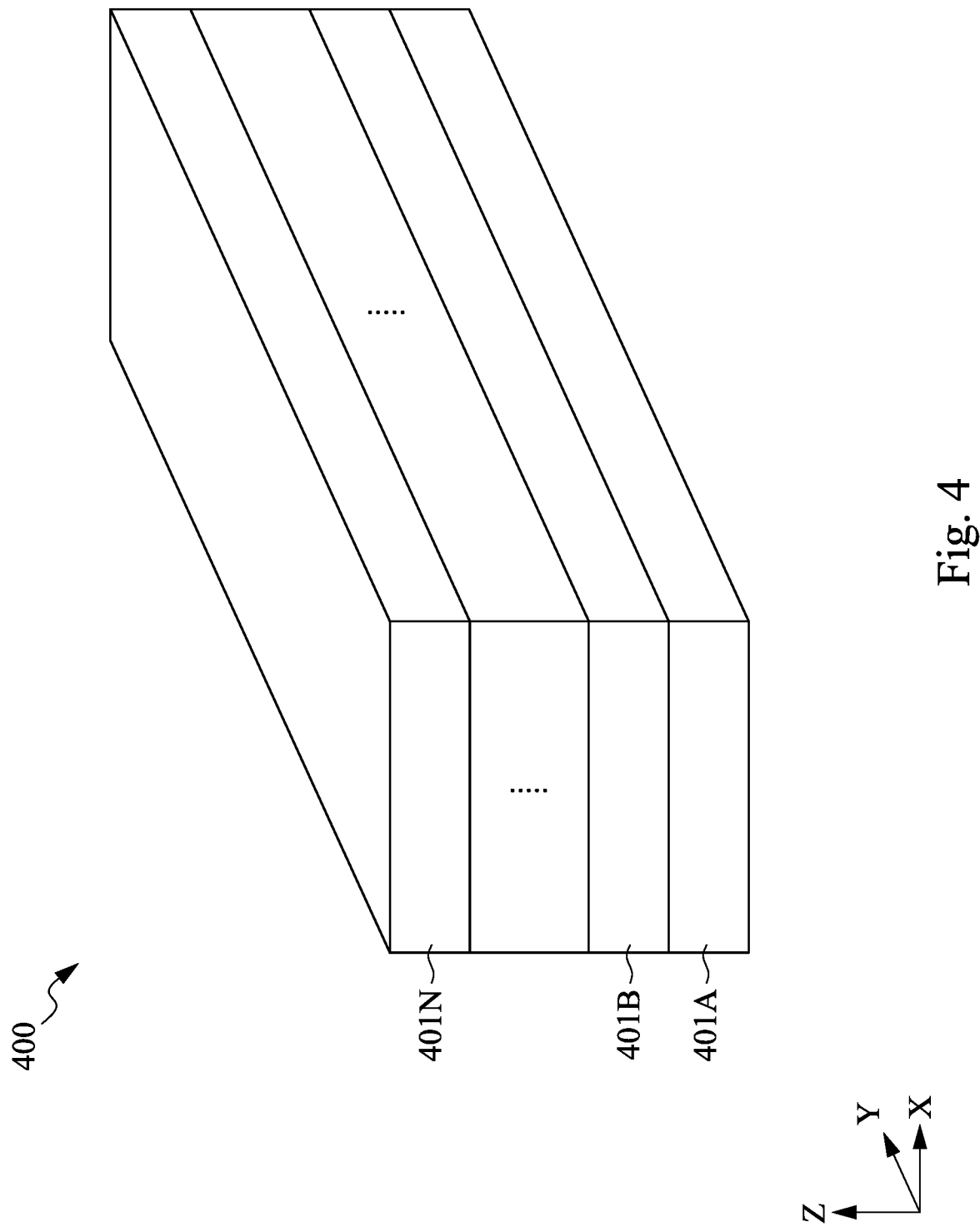
FIG. 4 illustrates a perspective view of a semiconductor chip analyzed by the method of FIG. 3, in accordance with some embodiments.

For example, the horizontal layers can include: a bottommost metallization layer of the semiconductor chip (typically referred to as "M0 layer") with respect to the front surface of a substrate where functioning devices of the semiconductor chip (e.g., transistors, capacitors, resistors, etc.) are formed; a first via layer of the semiconductor chip (typically referred to as "V0 layer") that electrically couples the M0 layer to a next higher metallization layer (typically referred to as "M1 layer"); and so on to a topmost metallization layer that includes a number of power rails and/or a number of input/output pins of the semiconductor chip (typically referred to as "AP layer"), and a boning layer on top of the AP layer that includes a number of bonding structures of the semiconductor chip (typically referred to as "HBMT layer"). FIG. 4 illustrates a simplified example of a workpiece (e.g., the semiconductor chip 400) being divided into a number of vertically stacked layers: 401A, 401B . . . 401N, which may correspond to the foregoing horizontal layers, respectively.

Next, in operation 306, the thermal analysis tool 110 can identify a number of feedthrough nets and a number of non-feedthrough nets of the semiconductor chip. In general, a semiconductor chip can include a number of nets, each of which electrically connects one component (e.g., an interconnect structure) to another and is configured to carry either power or signal across the semiconductor chip. While carrying such power or signal, heat can be generated along each of the nets. In other words, in addition to carrying power or signal, each of the nets can serve as a heat propagation path. To perform a thermal analysis on the semiconductor chip (e.g., how such heat propagates across the semiconductor chip), the thermal analysis tool 110 can identify whether each net belongs to a feedthrough net or a non-feedthrough net based on the layout of the semiconductor chip. In an aspect of various implementations of the present disclosure, the thermal analysis tool 110 may identify the nets according to the layout of the semiconductor chip, and group the nets into a first category and a second category that have the number of feedthrough nets and the number of non-feedthrough nets, respectively.

In various embodiments of the present disclosure, a feedthrough net refers to an electrical connection net or path that originates from a heat source (e.g., one or more functioning devices of the semiconductor chip) and fully extends through the semiconductor chip (e.g., traveling through or terminating at one or more bonding structures of the semiconductor chip); and a non-feedthrough net refers to an electrical connection net or path that originates from a heat source and terminates at an intermediate portion of the integrated circuit (e.g., without traveling through or terminating at one or more bonding structures of the semiconductor chip). Specifically, originating from the heat source, such a feedthrough net consists of a number of interconnect structures disposed in respective different foregoing (e.g., metallization, via, bonding) layers.

For example, one type of the feedthrough nets can be constituted by a number of interconnect structures, which are disposed from the bottommost metallization layer (e.g., M0 layer), through a number of intermediate/top metallization and intermediate/top via layers, to the bonding layer (e.g., HBMT layer). Such a feedthrough net typically travels through at least one power rail or at least one input/output pin of the semiconductor chip. The power rail can be configured to provide or otherwise carry a supply voltage (e.g., VDD, VSS) for the semiconductor chip; and the input/output pin can be configured to serve as an input or output interface of the semiconductor chip. Accordingly, such a type of feedthrough net is sometimes referred to as a power net or an input/output net. Another type of the feedthrough nets can be constituted by a number of interconnect structures, which include a through-silicon-via or through-substrate-via (TSV) structure. By extending through at least a substrate of a first semiconductor chip, such a TSV structure can be configured to electrically couple the first semiconductor chip to a second semiconductor chip (both of which the currently disclosed semiconductor chip 400 can include), in some embodiments. Accordingly, such a type of feedthrough net is sometimes referred to as a TSV net. On the other hand, the non-feedthrough net can also be constituted by a number of interconnect structures. However, none of these interconnect structures is disposed in a bonding layer (i.e., belongs to any of the bonding structures of the semiconductor chip) or includes a TSV structure. Such a non-feedthrough net can be configured to carry a signal from one functioning component (e.g., a transistor) to another. Accordingly, the non-feedthrough net is sometimes referred to as a signal net.

Figure 5:
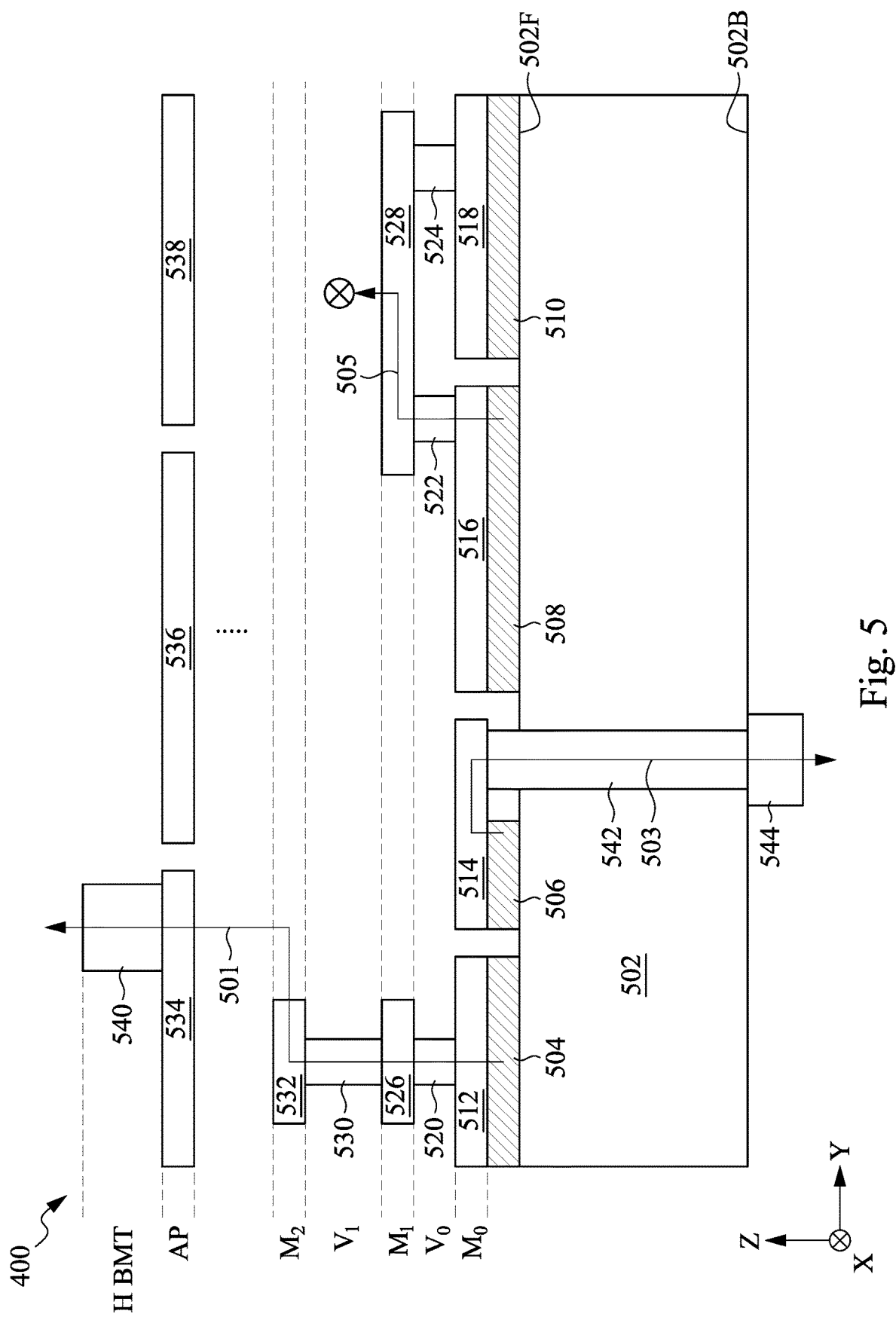
FIG. 5 illustrates a cross-sectional view of the semiconductor chip of FIG. 4, in accordance with some embodiments.

FIG. 5 illustrates a cross-sectional view of a portion of the semiconductor chip 400, e.g., cut along a plane expanded by the Y axis and the Z axis, that includes a first feedthrough net 501, a second feedthrough net 503, and a non-feedthrough net 505. In various embodiments of the present disclosure, each of the nets as disclosed herein, regardless of being a feedthrough or non-feedthrough one, is configured to propagate heat across the semiconductor chip 400, and more specifically, each or a majority of such heat propagation paths may extend along the Z axis. Stated another way, each of the disclosed nets can originate from a first horizontal layer (or a portion of such a first horizontal layer), travel through one or more second horizontal layers either vertically below or above the first horizontal layer, and terminate at a third horizontal layer further vertically below or above the second horizontal layer(s). Accordingly, each of the disclosed nets has at least a majority portion extending along the Z axis. However, each of the disclosed nets can extend laterally (i.e., having a heat propagation path extending horizontally), while remaining within the scope of the present disclosure.

As shown in FIG. 5, the semiconductor chip 400 includes: a substrate 502; a number of functioning devices (e.g., a transistor, a resistor, a capacitor, etc.) 504, 506, 508 and 510 disposed on a front side 502F of the substrate 502; a number of interconnect structures 512, 514, 516, and 518 disposed in the bottommost metallization layer, M0; a number of via structures 520, 522, and 524 disposed in the bottommost via layer, V0; a number of interconnect structures 526 and 528 disposed in one of the intermediate metallization layers, M1; a via structure 530 disposed in one of the intermediate via layers, V1; an interconnect structure 512 disposed in one of the intermediate metallization layers, M2; a number of interconnect structures 534, 536, and 538 (e.g., a power rail, an input/output pin) disposed in the topmost metallization layer, AP; a bonding structure 540 (e.g., a solder ball, a solder bump, a microbump (µbump), a metal pillar, a bonding pad, or otherwise connector structures) disposed in the bonding layer, HBMT; a TSV structure 542; and a bonding structure 544 (e.g., a solder ball, a solder bump, a microbump (µbump), a metal pillar, a bonding pad, or otherwise connector structures) disposed on a back side 502B of the substrate 502.

It should be appreciated that the cross-sectional view of semiconductor chip 400 in FIG. 5 is simplified for illustrate purposes, and thus, the semiconductor chip 400 can include any of various other components while remaining within the scope of the present disclosure. For example, vertically between a layer having the functioning devices 504-510 (which is sometimes referred to as a front-end-of-line (FEOL) layer) and the bottommost metallization layer M0 (which is sometimes referred to as one of a number of back-end-of-line (BEOL) layers), the semiconductor chip 400 can include a layer having a number of interconnect structures electrically coupling the functioning devices 504-510 to the interconnect structures formed in the BEOL layers (which is sometimes referred to as a middle-end-of-line (MEOL) layer). In another example, although the TSV structure 542 is shown as being coupled to the functioning device 506 through the M0 interconnect structure 514, it should be appreciated that the TSV structure 542 can be coupled to the functioning device 506 through one or more additional interconnect structures that are disposed in any of various other layers or in the same layer as the functioning device 506 (i.e., the FEOL layer).

In the illustrated example of FIG. 5, the feedthrough net 501, originating from the functioning device 504, is constituted by the interconnect structure 512, the via structure 520, the interconnect structure 526, the via structure 530, the interconnect structure 532, the interconnect structure 534, and the bonding structure 540. The feedthrough net 503, originating from the functioning device 506, is constituted by the interconnect structure 514, the TSV structure 542, and the bonding structure 544. As such, the feedthrough nets 501 and 503 each travel from at least a functioning device (which serves as a heat source), through a number of interconnect structures, via structures, and/or TSV structures, and to a bonding structure. Such a feedthrough net, terminating with an "outlet" or "vent" (e.g., a bonding structure) for the semiconductor chip 400, is sometimes referred to as chimney net or chimney structure, according to various embodiments of the present disclosure. The non-feedthrough net 505, originating from the functioning device 504 and terminating at a middle portion of the semiconductor chip 400, is constituted by the interconnect structure 516, the via structure 522, and the interconnect structure 528. As such, the non-feedthrough net 505 travels from at least a functioning device (which serves as a heat source) and terminates at an interconnect structure disposed in the middle portion of the semiconductor chip 400. Such a non-feedthrough net, terminating with no "outlet" or "vent" for the semiconductor chip 400, is sometimes referred to as non-chimney net or non-chimney structure, according to various embodiments of the present disclosure.

Referring again to operation 306 (FIG. 3), the thermal analysis tool 110 can identify such feedthrough nets and non-feedthrough nets based on a layout of the semiconductor chip 400. According to various embodiments of the present disclosure, upon receiving the layout of the semiconductor chip 400, the thermal analysis tool 110 can locate each and every bonding structure of the semiconductor chip 400. The thermal analysis tool 110 can trace or otherwise identify a connection path of each of the bonding structures. Specifically, the thermal analysis tool 110 can identify all the interconnect structures and via structures that are directly or indirectly coupled to each of the bonding structures, so as to identify a feedthrough net. In some embodiments, upon identifying all the feedthrough nets across the semiconductor chip 400, the thermal analysis tool 110 may identify all other nets as non-feedthrough nets. Using the feedthrough net 501 as a representative example, in response to locating the bonding structure 540, the thermal analysis tool 110 can first identify the interconnect structure (e.g., 534) directly connecting to the bonding structure 540 and then identify the via and interconnect structures (e.g., 532, 530, 526, 520, 512) indirectly coupled to the bonding structure 540 until such a connection path ends at a functioning device (e.g., 504).

Next, referring to operations 308 and 310, in response to identifying the feedthrough nets and non-feedthrough nets across the semiconductor chip 400, the thermal analysis tool 110 can construct each of the feedthrough nets with a number of first grid units, and construct each of the non-feedthrough nets with a number of second grid units, respectively. In various embodiments of the present disclosure, a first size of first grid units is substantially smaller than a second size of the second grid unit. The first size can refer to a length of the first grid unit extending along one of the X axis, the Y axis, or the Z axis; and similarly, the second size can refer to a length of the second grid unit extending along one of the X axis, the Y axis, or the Z axis.

In various embodiments of the present disclosure, the thermal analysis tool 110 may control the first size such that each first grid unit, constructing a corresponding feedthrough net, encloses at least a portion of a structure essentially consisting of a metal material (e.g., an interconnect structure, a via structure, a bonding structure). For example, the thermal analysis tool 110 can generate the first grid unit extending along the Z axis with a length (i.e., a height) based on a vertical height of one or more of the via structures along which the feedthrough net travels. In response to determining a height of one or more of the "traveled" via structures, the thermal analysis tool 110 can generate the first grid unit with a height that is at most one half of the height of the via structure. Similarly, the thermal analysis tool 110 can generate the first grid unit extending along the X or Y axis with a length based on a lateral length/width of one or more of the via structures along which the feedthrough net travels. In response to determining a lateral length/width of one or more of the "traveled" via structures, the thermal analysis tool 110 can generate the first grid unit with a length/width that is at most one half of the lateral length/width of the via structure. As such, each of the first grid units, configured to construct a feedthrough net, can enclose (e.g., in at least one of the X, Y, or Z axis) at least a portion of a metal structure. It should be appreciated that the first size of the first grid units of a feedthrough net may not be a constant value along the feedthrough net, while remaining within the scope of the present disclosure.

Figure 6:
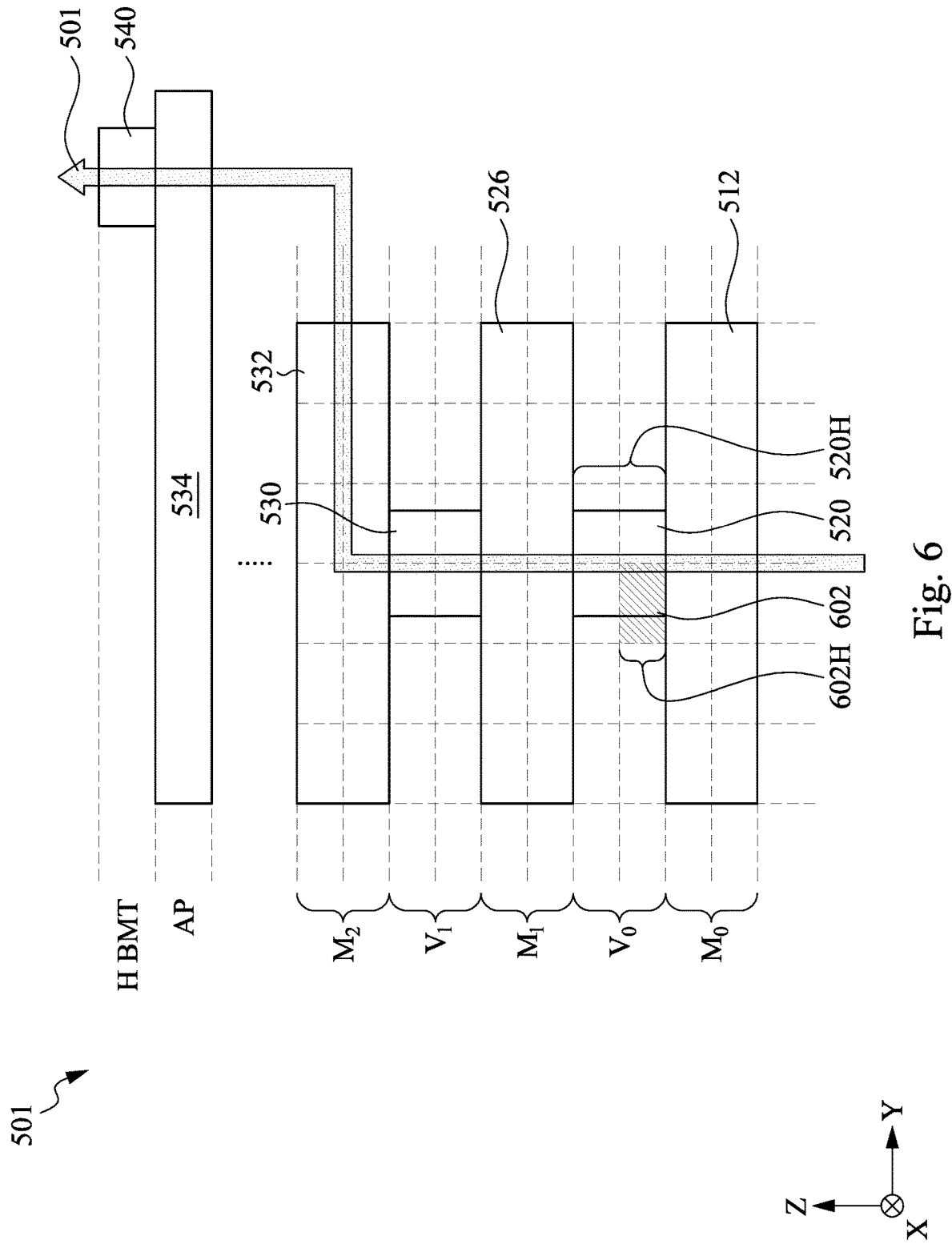
FIG. 6 illustrates a number of first gird units configured to construct a feedthrough net of the semiconductor chip of FIG. 4, in accordance with some embodiments.

FIG. 6 illustrates a portion of a feedthrough net (e.g., 501) constructed by a number of first grid units 602. The thermal analysis tool 110 can identify that such a portion of the feedthrough net 501 travels along the interconnect structure 512, the via structure 520, the interconnect structure 526, the via structure 530, and the interconnect structures 532 and 534, and terminates at the bonding structure 540 (operation 306). In response to determining that a height of the via structure 520, for example, is 520H, the thermal analysis tool 110 can construct at least the portion of the feedthrough net 501 with the first grid units 602, each or at least some of which have a height, 602H. The height 602H may be equal to or less than one half of the height 520H, according to various embodiments of the present disclosure. In various embodiments, the thermal analysis tool 110 can determine a thermal conductivity of each of the first grid units 602 based on its contained metal density, which will be discussed in further detail below.

In various embodiments of the present disclosure, the thermal analysis tool 110 may control the second size of the second grid unit, constructing a corresponding non-feedthrough net, to be greater than the first size of the first grid unit. For example, the thermal analysis tool 110 can generate the second grid unit extending along the Z axis with a length (i.e., a height) based on a vertical height of one or more of the metallization and via layers along which the non-feedthrough net travels. In response to determining a height of one or more of the "traveled" metallization and via layers, the thermal analysis tool 110 can generate the second grid unit with a height that is about a combination of the respective heights of neighboring metallization layer(s) and via layer(s). Similarly, the thermal analysis tool 110 can generate the second grid unit extending along the X or Y axis with a length based on a lateral length/width of one or more of the via structures along which the non-feedthrough net travels. In response to determining a lateral length/width of one or more of the "traveled" via structures, the thermal analysis tool 110 can generate the second grid unit with a length/width that is at most the lateral length/width of the via structure. As such, the second grid unit may not enclose (e.g., in at least the Z axis) a structure essentially consisting of a metal material (e.g., an interconnect structure, a via structure, a bonding structure). It should be appreciated that the second size of the second grid units may not be a constant value along a path of any of the non-feedthrough nets, while remaining within the scope of the present disclosure.

Figure 7:
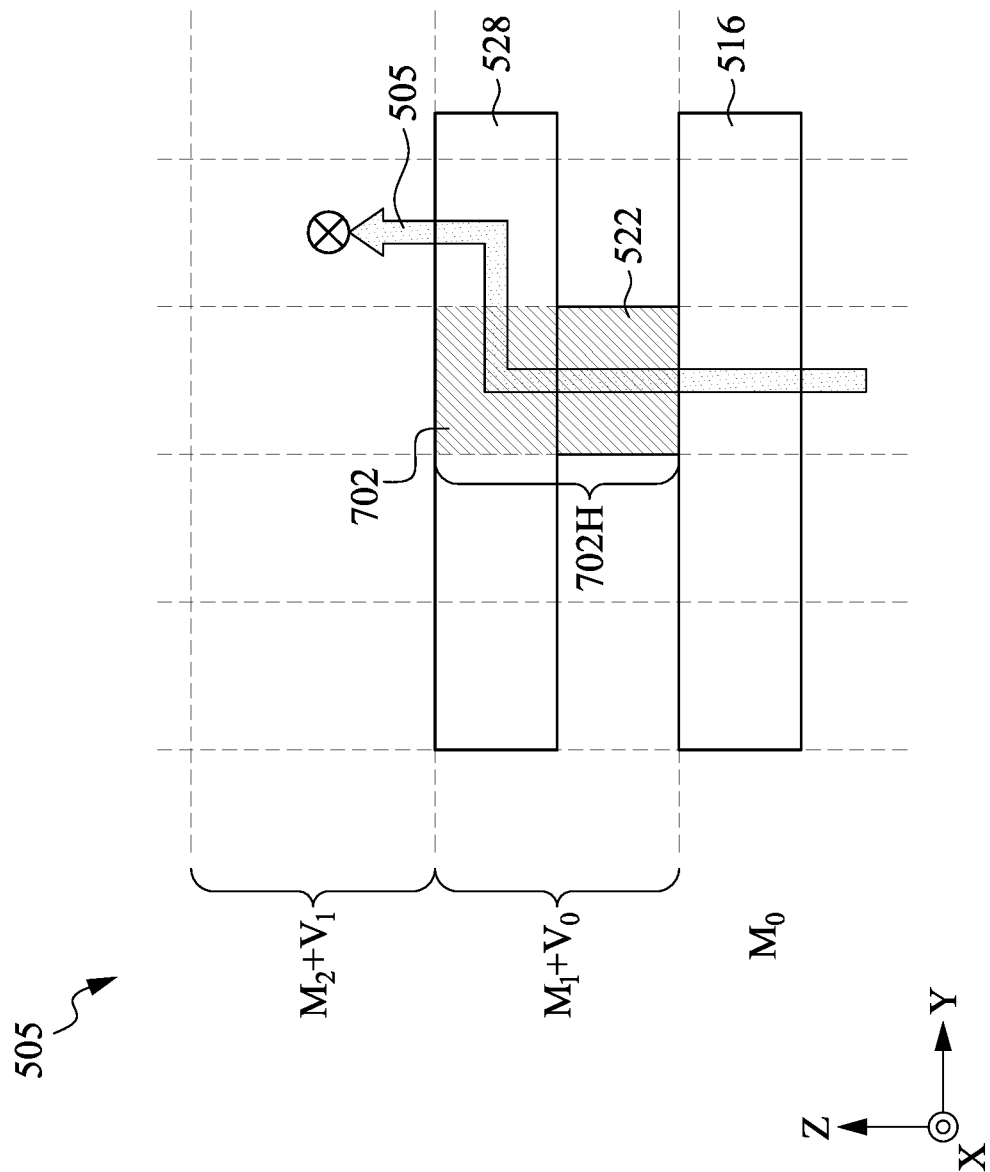
FIG. 7 illustrates a number of second gird units configured to construct a non-feedthrough net of the semiconductor chip of FIG. 4, in accordance with some embodiments.

FIG. 7 illustrates a portion of a non-feedthrough net (e.g., 505) constructed by a number of second grid units 702. The thermal analysis tool 110 can identify that such a portion of the non-feedthrough net 505 travels along the interconnect structure 516, the via structure 522, and the interconnect structure 528, and terminates at no bonding structure (operation 306). In response, the thermal analysis tool 110 can construct the non-feedthrough net 505 with the second grid units 702 that have the second size greater than the first size of the first grid units 602. In various embodiments, the second grid unit 702 may extend along the Z axis with a length (e.g., a height), 702H, that is about a combination of respective heights of multiple neighboring layers. In the illustrated example of FIG. 7, the height 702H is a sum of heights of the V0 via layer and the M0 metallization layer. It should be noted that a (e.g., upper) boundary of the second grid unit 702 is in contact with a dielectric layer (e.g., an IMD of the V1 layer), since the non-feedthrough net 505 does not further extend over the interconnect structure 528. In various embodiments, the thermal analysis tool 110 can determine a thermal conductivity of each of the second grid units 702 based on a type of its material compositions, which will be discussed in further detail below.

Referring next to operation 312, in response to constructing each of the feedthrough nets with a number of first grid units, the thermal analysis tool 110 can be configured to estimate a first "grid" thermal conductivity of each of the first grid units, and estimate a first "net" thermal conductivity of the corresponding feedthrough net based on the respective first grid thermal conductivities of the first grid units constructing the corresponding feedthrough net, according to one aspect of various embodiments. With the respective first net thermal conductivities of one or more feedthrough nets across the whole semiconductor chip, the thermal analysis tool 110 can estimate an overall "feedthrough net" thermal conductivity for the whole semiconductor chip.

For example, the thermal analysis tool 110 can estimate the first grid thermal conductivity of a first grid unit based on a metal density contained in that first grid unit, and estimate the corresponding first net thermal conductivity. Specifically, the thermal analysis tool 110 can calculate a metal density of each of the first grid units along a corresponding feedthrough net, multiply the metal density by the thermal conductivity of a bulk metal material (e.g., about 400 $Wm^{-1}K^{-1}$ for copper) to estimate the first grid thermal conductivity of each first grid unit (e.g., $k_{g11}$, $k_{g12}$, $k_{g13}$, etc.), and estimate the first net thermal conductivity (e.g., $k_{n11}$, $k_{n12}$, $k_{n13}$, etc.) by combining the corresponding first grid thermal conductivities (e.g., $1/k_{n11}=1/k_{g11}+1/k_{g12}+1/k_{g13}+\ldots$). Upon having the first net thermal conductivity for each of the feedthrough nets, the thermal analysis tool 110 can estimate an overall feedthrough net thermal conductivity (e.g., $k_{fn}$) for the whole semiconductor chip by combining the plural first net thermal conductivities (e.g., $1/k_{fn}=1/k_{n11}+1/k_{n12}+1/k_{n13}+ \ldots$).

Referring still to operation 312, in response to constructing each of the feedthrough nets with a number of first grid units, the thermal analysis tool 110 can be configured to estimate a first "layer" thermal conductivity of each of the layers (formed in operation 304) based on an overall metal density of a subset of the first grid units that are disposed in the corresponding layer, according to another aspect of various embodiments. With the respective first layer thermal conductivities of the layers across the whole semiconductor chip, the thermal analysis tool 110 can estimate an overall "feedthrough net" thermal conductivity for the whole semiconductor chip.

For example, the thermal analysis tool 110 can estimate an overall metal density (in percentage) of a subset of the first grid units that are disposed in a corresponding one of the layers (e.g., the M0 layer, the V0 layer, etc.), multiply the overall metal density by the thermal conductivity of a bulk metal material (e.g., about 400 $Wm^{-1}K^{-1}$ for copper) to estimate a first layer thermal conductivity for the corresponding layer (e.g., $k_{l11}$, $k_{l12}$, $k_{l13}$, etc.), and estimate an overall "feedthrough net" thermal conductivity (e.g., $k_{fn}$) for the whole semiconductor chip by combining the plural first layer thermal conductivities (e.g., $1/k_{fn}=1/k_{l11}+1/k_{l12}+1/k_{l13}+ \ldots$).

Referring next to operation 314, in response to constructing each of the non-feedthrough nets with a number of second grid units, the thermal analysis tool 110 can be configured to estimate a second "grid" thermal conductivity of each of the second grid units, and estimate a second "net" thermal conductivity of the corresponding non-feedthrough net based on the respective second grid thermal conductivities of the second grid units constructing the corresponding non-feedthrough net, according to one aspect of various embodiments. With the respective second net thermal conductivities of one or more non-feedthrough nets across the whole semiconductor chip, the thermal analysis tool 110 can estimate an overall "non-feedthrough net" thermal conductivity for the whole semiconductor chip.

For example, the thermal analysis tool 110 can estimate the second grid thermal conductivity of a second grid unit based on identifying its type of material compositions, and estimate the corresponding second net thermal conductivity. Specifically, the thermal analysis tool 110 can identify a composition type of each of the second grid units along a corresponding non-feedthrough net, estimate the second grid thermal conductivity of each second grid unit (e.g., $k_{g21}$, $k_{g22}$, $k_{g23}$, etc.) according to the identified type, and estimate the second net thermal conductivity (e.g., $k_{n21}$, $k_{n22}$, $k_{n23}$, etc.) by combining the corresponding second grid thermal conductivities (e.g., $1/k_{n21}=1/k_{g21}+1/k_{g22}+1/k_{g23}+ \ldots$). Upon having the second net thermal conductivity for each of the non-feedthrough nets, the thermal analysis tool 110 can estimate an overall non-feedthrough net thermal conductivity (e.g., $k_{nfn}$) for the whole semiconductor chip by combining the plural second net thermal conductivities (e.g., $1/k_{nfn}=1/k_{n21}+1/k_{n22}+1/k_{n23}+ \ldots$).

Figure 10:
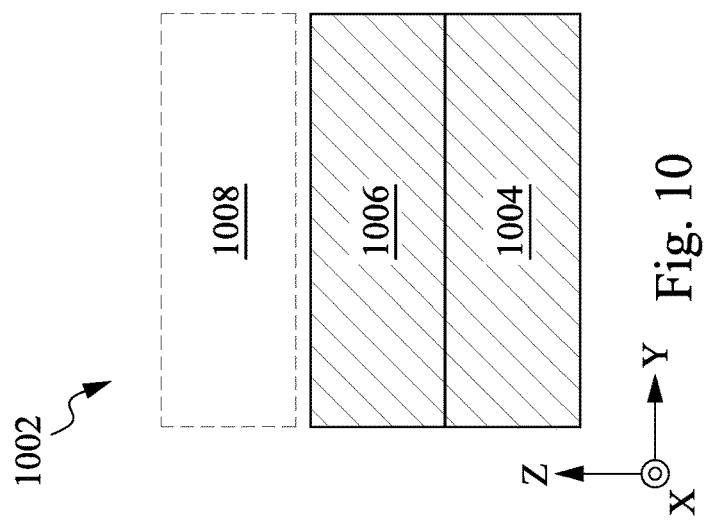
FIGS. 8, 9, and 10 respectively illustrate various composition types of the second grid unit of FIG. 7, in accordance with some embodiments.
Figure 9:
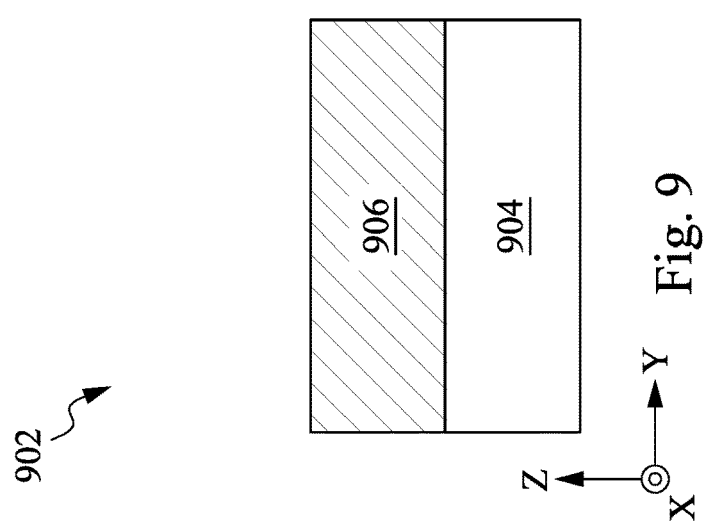
Figure 8:
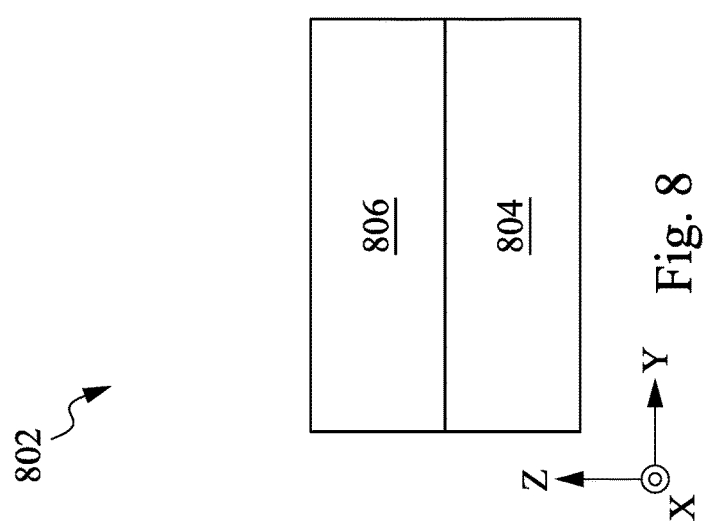

FIGS. 8, 9, and 10 illustrate various composition types of a second grid unit (e.g., 802, 902, 1002) configured to construct a non-feedthrough net, respectively, in accordance with various embodiments of the present disclosure. Similar to the second grid unit 702 of FIG. 7, the second grid unit illustrated in each of FIGS. 8-10 has a height equal to a sum of heights of two neighboring layers. However, it should be understood that the height of the second grid unit can be adjusted to be equal to a sum of heights of any number of neighboring layers, while remaining within the scope of the present disclosure.

In FIG. 8, the second grid unit 802 extends across two layer portions 804 and 806, each of which may essentially consist of a dielectric material that forms an IMD. Accordingly, a second grid thermal conductivity of the second grid unit 802 may be equal to 0.25 $Wm^{-1}K^{-1}$, which is equal to a thermal conductivity of the dielectric material (e.g., a low-k dielectric material, $SiO_2$).

In FIG. 9, the second grid unit 902 extends across two layer portions 904 and 906. The layer portion 904 may essentially consist of a dielectric material that forms an IMD, and the layer portion 906 may essentially consist of a metal material that forms an interconnect structure or a via structure. Accordingly, a second grid thermal conductivity of the second grid unit 902 may be equal to 0.5 $Wm^{-1}K^{-1}$, which is derived based on $1/0.25+1/400$, where the metal material of the layer portion 906 is copper.

In FIG. 10, the second grid unit 1002 extends across two layer portions 1004 and 1006. The layer portions 1004 and 1006 may each essentially consist of a metal material that forms an interconnect structure or a via structure. However, the second grid unit 1002 has an upper boundary in direct contact with a layer portion 1008 that is formed of a dielectric material (similar to the second grid unit 702 of FIG. 7). As a result, a second grid thermal conductivity of the second grid unit 1002 may be equal to 0.75 $Wm^{-1}K^{-1}$, which is derived based on $1/0.25+1/400+1/400$, where the metal material of the layer portions 1004 and 1006 is copper.

Referring still to operation 314, in response to constructing each of the non-feedthrough nets with a number of second grid units, the thermal analysis tool 110 can be configured to estimate a second "layer" thermal conductivity of each of the layers (formed in operation 304) based on an overall metal density of a subset of the second grid units that are disposed in the corresponding layer, according to another aspect of various embodiments. With the respective second layer thermal conductivities of the layers across the whole semiconductor chip, the thermal analysis tool 110 can estimate an overall "non-feedthrough net" thermal conductivity for the whole semiconductor chip.

For example, the thermal analysis tool 110 can estimate an overall metal density (in percentage) of a subset of the second grid units that are disposed in corresponding one or more of the layers (e.g., the M0 layer, the V0 layer, etc.), and multiply the overall metal density by a weighted sum of the second thermal conductivities of the subset of the second grid units to estimate a second layer thermal conductivity for the corresponding layer(s) (e.g., $k_{l21}$, $k_{l22}$, $k_{l23}$, etc.). In the present disclosure, the weighted sum refers to a sum of the second thermal conductivities of the subset of the second grid units weighted (multiplied) by respective ratios across the corresponding layer(s). The thermal analysis tool 110 can then estimate an overall "non-feedthrough net" thermal conductivity (e.g., $k_{nfn}$) for the whole semiconductor chip by combining the plural second layer thermal conductivities (e.g., $1/k_{nfn}=1/k_{l21}+1/k_{l22}+1/k_{l23}+ \ldots$).

Referring next to operation 316, upon estimating the thermal conductivity ($k_{fn}$) for each of the feedthrough nets and the thermal conductivity ($k_{nfn}$) for each of the non-feedthrough nets across the whole semiconductor chip, the thermal analysis tool 110 can estimate an equivalent thermal conductivity of the semiconductor chip by summing the number of $k_{fn}$'s and the number of $k_{nfn}$'s. As mentioned above, each of the nets, regardless of being a feedthrough or non-feedthrough one, serves as a heat propagation path extending along the Z axis. Accordingly, the equivalent thermal conductivity, derived by summing the $k_{fn}$'s and $k_{nfn}$'s, may serve as a Z component of an overall equivalent thermal conductivity of the semiconductor chip (hereinafter "$k_{eqz}$"), in various embodiments. With such an equivalent thermal conductivity ($k_{eqz}$), the thermal analysis tool 110 can effectively and accurately analyze various temperature-related profiles of the semiconductor chip.

According to one of various embodiments of the present disclosure, equivalently, the thermal analysis tool 110 can identify a number of nets across a semiconductor chip, determine whether each of the nets is a feedthrough net or a non-feedthrough net, estimate a collective percentage of the feedthrough nets among all the nets, estimate a collective percentage of the non-feedthrough nets among all the nets, calculate an equivalent thermal conductivity of all the feedthrough nets based on the collective percentage, calculate an equivalent thermal conductivity of all the non-feedthrough nets based on the collective percentage, and estimate an equivalent thermal conductivity of the whole semiconductor chip.

Table I below summarizes such an embodiment.

TABLE I

| Type | Net | Percentage | Thermal Conductivity | Equivalent Thermal Conductivity ($K_{eq}$) |
|---|---|---|---|---|
| Feed-through | Power net and/or I/O net | a % | $k_1$ = a % × thermal conductivity of a bulk metal material | $K_{eq} = K_1 + K_2 + K_3$ |
|  | TSV net | b % | $k_2$ = b % × thermal conductivity of a bulk metal material |  |
| Non-feed-through | Signal net | c % | $k_3$ = c % × ($C_1 \times Z_1 + C_2 \times Z_2 + C_3 \times Z_3$), where $Z_1$, $Z_2$, and $Z_3$ represent thermal conductivities of those three types discussed with respect to FIGs. 8, 9, and 10, respectively, and $C_1$, $C_2$, and $C_3$ represent respective ratios of those three types in each non-feedthrough net. |  |

In various embodiments, through multiplying an inverse of $k_{eqz}$ by a thickness (L) of the semiconductor chip and further dividing the result by an area (A) of the semiconductor chip $$\left(\text{i.e., } \frac{1}{keqz} \times \frac{L}{A}\right),$$

an equivalent heat resistance ($R_{eqz}$) can be derived. Further, through multiplying the equivalent heat resistance ($R_{eqz}$) by a power, which can be derived through the simulation(s) performed by the design/performance tool 120, a temperature difference of the semiconductor chip along the Z axis can be effectively derived.

In addition to the Z component of the overall equivalent thermal conductivity ($k_{eqz}$), the thermal analysis tool 110 can effectively estimate an X component and a Y component of the overall equivalent thermal conductivity, $k_{eqx}$ and $k_{eqy}$, based on a metal density in each of the layers. After estimating the $k_{eqx}$ or $k_{eqy}$ in each of the layers, the thermal analysis tool 110 can estimate an overall $k_{eqx}$ or $k_{eqy}$ by summing the equivalent $k_{eqx}$'s or $k_{eqy}$'s across all the layers. In various embodiments, to calculate the $k_{eqx}$ in one of the layers, the thermal analysis tool 110 may divide the layer into a number of stripes, each of which extends along the X axis, estimate a "stripe" thermal conductivity of each of such X stripes based on a metal density of the X stripe, and estimate the $k_{eqx}$ based on a weighted sum of the stripe thermal conductivities. Similarly, to calculate the $k_{eqy}$ in one of the layers, the thermal analysis tool 110 may divide the layer into a number of stripes, each of which extends along the Y axis, estimate a "stripe" thermal conductivity of each of such Y stripes based on a metal density of the Y stripe, and estimate the $k_{eqy}$ based on a weighted sum of the stripe thermal conductivities.

Figure 11:
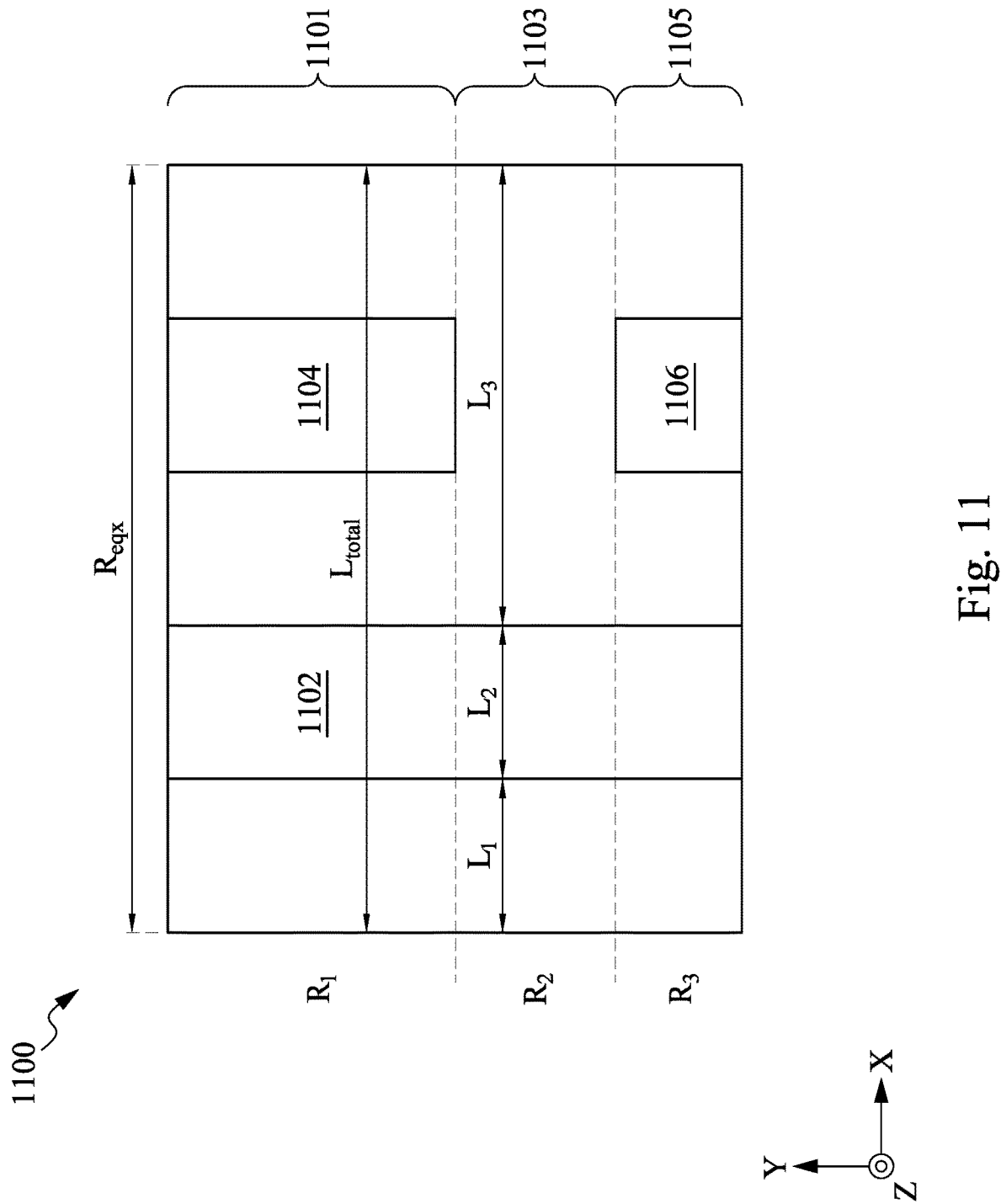
FIG. 11 illustrates a portion of a layer of the semiconductor chip of FIG. 4 where an X component of an equivalent thermal conductivity is estimated, in accordance with some embodiments.

For example in FIG. 11, a portion of a layer of a semiconductor chip (hereinafter "partial layer 1100") is illustrated. Within an area of the partial layer 1100, a first interconnect structure 1102, a second interconnect structure 1104, and a third interconnect structure 1106, each of which is formed of a metal material (e.g., copper), are included. The thermal analysis tool 110 can divide the partial layer 1100 into a number of stripes 1101, 1103 and 1105, each of which has a lengthwise direction along the X axis. Next, based on a metal density of each stripe, the thermal analysis tool 110 can estimate respective stripe thermal conductivities of the stripes 1101 to 1105, $k_1$, $k_2$, and $k_3$.

As a representative example, the thermal analysis tool 110 estimates the stripe thermal conductivity $k_2$ based on the following equation: $1/k_2 = L_1/L_{total} \times 1/k_d + L_2/L_{total} \times 1/k_m + L_3/L_{total} \times 1/k_d$, where $L_1$ represents a length of a first section of the stripe 1103 that is formed of a dielectric material, $L_2$ represents a length of a second section of the stripe 1103 that is formed of a metal material, $L_3$ represents a length of a third section of the stripe 1103 that is formed of a dielectric material, $L_{total}$ represents a length of the stripe 1103, $k_m$ represents a bulk thermal conductivity of the metal material, and $k_d$ represents a bulk thermal conductivity of the dielectric material. Following the foregoing principle, the thermal analysis tool 110 can estimate the stripe thermal conductivities $k_1$ and $k_3$. Next, the thermal analysis tool 110 can estimate a thermal conductivity $k_{eqx}$ of the partial layer 1100 based on the following equation: $\alpha_1 k_1 + \alpha_2 k_2 + \alpha_3 k_3$, where $\alpha_1$ represents an area ratio of the stripe 1101, $\alpha_2$ represents an area ratio of the stripe 1103, and $\alpha_3$ represents an area ratio of the stripe 1105.

Figure 12:
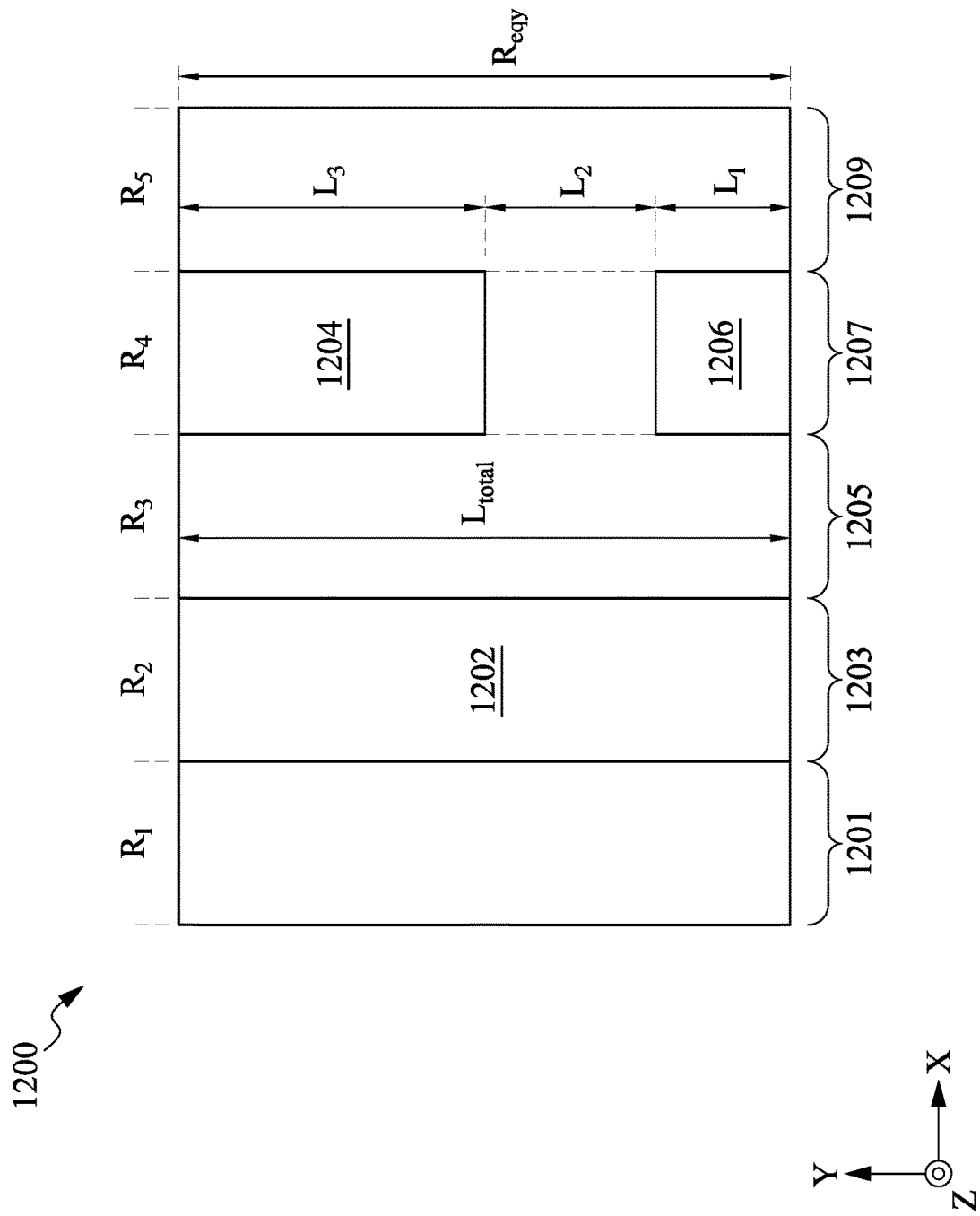
FIG. 12 illustrates a portion of a layer of the semiconductor chip of FIG. 4 where a Y lateral component of an equivalent thermal conductivity is estimated, in accordance with some embodiments.

For example in FIG. 12, a portion of a layer of a semiconductor chip (hereinafter "partial layer 1200") is illustrated. Within an area of the partial layer 1200, a first interconnect structure 1202, a second interconnect structure 1204, and a third interconnect structure 1206, each of which is formed of a metal material (e.g., copper), are included. The thermal analysis tool 110 can divide the partial layer 1200 into a number of stripes 1201, 1203, 1205, 1207, and 1209, each of which has a lengthwise direction along the Y axis. Next, based on a metal density of each stripe, the thermal analysis tool 110 can estimate respective stripe thermal conductivities of the stripes 1201 to 1209, $k_1$, $k_2$, $k_3$, $k_4$, $k_5$.

As a representative example, the thermal analysis tool 110 estimates the stripe thermal conductivity $k_4$ based on the following equation: $1/k_4 = L_1 L_{total} \times 1/k_m + L_2/L_{total} \times 1/k_d + L_3/L_{total} \times 1/k_m$, where $L_1$ represents a length of a first section of the stripe 1207 that is formed of a metal material, $L_2$ represents a length of a second section of the stripe 1207 that is formed of a dielectric material, $L_3$ represents a length of a third section of the stripe 1207 that is formed of a metal material, $L_{total}$ represents a length of the stripe 1207, $k_m$ represents a bulk thermal conductivity of the metal material, and $k_d$ represents a bulk thermal conductivity of the dielectric material. Following the foregoing principle, the thermal analysis tool 110 can estimate the stripe thermal conductivities $k_1$, $k_2$, $k_3$, and $k_5$. Next, the thermal analysis tool 110 can estimate a thermal conductivity $k_{eqv}$, of the partial layer 1200 based on the following equation: $\alpha_1 k_1 + \alpha_2 k_2 + \alpha_3 k_3 + \alpha_4 k_4 + \alpha_s k_s$, where $\alpha_1$ represents an area ratio of the stripe 1201, $\alpha_2$ represents an area ratio of the stripe 1203, $\alpha_3$ represents an area ratio of the stripe 1205, $\alpha_4$ represents an area ratio of the stripe 1207, and $\alpha_s$ represents an area ratio of the stripe 1209.

In one aspect of the present disclosure, a method for analyzing an integrated circuit is disclosed. The method includes receiving, by a thermal analysis tool, a layout of an integrated circuit. The method includes identifying, by the thermal analysis tool, based on the layout, at least a first net and at least a second net. The first net extends through the integrated circuit along a vertical direction, and the second net terminates at a middle portion of the integrated circuit along the vertical direction. The method includes dividing, by the thermal analysis tool, the integrated circuit into a plurality of grid units. The first net is constituted by a first subset of the plurality of grid units, and the second net is constituted by a second subset of the plurality of grid units. The method includes estimating, by the thermal analysis tool, a first thermal conductivity of each of the first subsets of grid units. The method includes estimating, by the thermal analysis tool, a second thermal conductivity of each of the second subsets of grid units. The method includes estimating, by the thermal analysis tool, an equivalent thermal conductivity of the integrated circuit based on combining the first thermal conductivity and the second thermal conductivity.

In another aspect of the present disclosure, an automation system is disclosed. The system includes at least one processor, and at least one memory including computer program code for one or more programs. The at least one memory and the computer program code are configured to, with the at least one processor, cause the system to: group a plurality of nets of an integrated circuit into a first category and a second category based on a layout of the integrated circuit, wherein the first category includes a plurality of first nets and the second category includes a plurality of second nets; construct each of the plurality of first nets with a plurality of first grid units; construct each of the plurality of second nets with a plurality of second grid units, wherein a second size of the plurality of second grid units is different from a first size of the plurality of first grid units; estimate first thermal conductivities of the plurality of first grid units, respectively, based on the first size; estimate second thermal conductivities of the plurality of second grid units, respectively, based on the second size; and estimate an equivalent thermal conductivity of the integrated circuit based on combining the first thermal conductivities and the second thermal conductivities.

In yet another aspect of the present disclosure, a non-transitory computer readable medium comprising computer executable instructions for carrying out a method for analyzing an integrated circuit is disclosed. The method includes receiving a layout of an integrated circuit. The method includes identifying a plurality of nets of the integrated circuit based on the layout. The method includes grouping the plurality of nets into a first category and a second category based on the layout of the integrated circuit. The first category includes a plurality of first nets that each serve as a power net or an input/output net of the integrated circuit, and the second category includes a plurality of second nets that each serve as a signal net of the integrated circuit. The method includes estimating respective first thermal conductivities of a plurality of first grid units disposed along the plurality of first nets. The method includes estimating respective second thermal conductivities of a plurality of second grid units disposed along the plurality of second nets. The method includes estimating an equivalent thermal conductivity of the integrated circuit based on the first thermal conductivities and the second thermal conductivities. The method includes performing a thermal analysis on the integrated circuit based on the equivalent thermal conductivity.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for analyzing an integrated circuit, comprising:
   receiving, by a thermal analysis tool, a layout configured for physically forming an integrated circuit;
   identifying, by the thermal analysis tool, at least a first net and at least a second net of the formed integrated circuit, wherein the first net extends through the integrated circuit along a vertical direction, and the second net terminates at a middle portion of the integrated circuit along the vertical direction;
   dividing, by the thermal analysis tool, the integrated circuit into a plurality of grid units, wherein the first net is constituted by a first subset of the plurality of grid units, and the second net is constituted by a second subset of the plurality of grid units;
   estimating, by the thermal analysis tool, a first thermal conductivity of each of the first subsets of grid units;
   estimating, by the thermal analysis tool, a second thermal conductivity of each of the second subsets of grid units; and
   estimating, by the thermal analysis tool, an equivalent thermal conductivity of the integrated circuit based on combining the first thermal conductivity and the second thermal conductivity.

2. The method of claim 1, wherein the first net originates from a first heat source, travels through one or more first interconnect structures of the integrated circuit, and ends at one of a plurality of bonding structures of the integrated circuit, and wherein the second net originates from a second heat source, travels through one or more second interconnect structures of the integrated circuit, and ends at a dielectric structure of the integrated circuit.

3. The method of claim 2, wherein the first and second heat sources are disposed along a surface of a substrate of the integrated circuit.

4. The method of claim 3, wherein the plurality of bonding structures are disposed away from the substrate with a first distance along the vertical direction, and the one or more second interconnect structures are disposed away from the substrate with a second distance, the first distance being substantially greater than the second distance.

5. The method of claim 1, wherein a first size of one of the first subset of grid units is substantially smaller than a second size of one of the second subset of grid units.

6. The method of claim 1, wherein the first net serves as at least one of a power net or an input/output net.

7. The method of claim 1, wherein the second net serves as a signal net.

8. The method of claim 1, wherein each of the first subset of grid units includes at least a portion of one of a plurality of interconnect structures of the integrated circuit, the plurality of interconnect structures essentially consisting of a metal material.

9. The method of claim 1, wherein each of the second subset of grid units includes at least a portion of a interlayer disposed between adjacent ones of a plurality of interconnect structures of the integrated circuit, the interlayer essentially consisting of a dielectric material.

10. The method of claim 1, wherein the step of estimating the first thermal conductivity of each of the first subsets of grid units further comprises:
    calculating, by the thermal analysis tool, a respective metal density of each of the first subset of grid units; and
    multiplying, by the thermal analysis tool, the metal density by a thermal conductivity of a bulk metal material to estimate the first thermal conductivity.

11. The method of claim 1, wherein the step of estimating the second thermal conductivity of each of the second subsets of grid units further comprises:
    identifying, by the thermal analysis tool, a respective type of each of the second subset of grid units to determine the second thermal conductivity, wherein the type includes: a first type, essentially consisting of a first dielectric material, that is associated with a lowest combined thermal conductivity; a second type, including a half of a second dielectric material and a half of a first metal material, that is associated with a medium combined thermal conductivity; and a third type, essentially consisting of a second metal material, that is associated with a highest combined thermal conductivity.

12. A automation system, comprising:
    at least one processor; and
    at least one memory including computer program code for one or more programs, the at least one memory and the computer program code configured to, with the at least one processor, cause the system to:
        group a plurality of nets of an integrated circuit into a first category and a second category, wherein the integrated circuit is physically formed based on a layout, and wherein the first category includes a plurality of first nets and the second category includes a plurality of second nets each extending through the formed integrated circuit;
        construct each of the plurality of first nets with a plurality of first grid units;
        construct each of the plurality of second nets with a plurality of second grid units, wherein a second size of the plurality of second grid units is different from a first size of the plurality of first grid units;
        estimate first thermal conductivities of the plurality of first grid units, respectively, based on the first size;
        estimate second thermal conductivities of the plurality of second grid units, respectively, based on the second size; and
        estimate an equivalent thermal conductivity of the integrated circuit based on combining the first thermal conductivities and the second thermal conductivities.

13. The system of claim 12, wherein each of the plurality of first nets in the first category operatively serves as a portion of a power net or a portion of an input/output net, and each of the plurality of second nets in the second category operatively serves as a portion of a signal net.

14. The system of claim 12, wherein the first size is substantially smaller than the second size.

15. The system of claim 12, wherein the system is further caused to assign each of the plurality of first nets into the first category based on identifying that the corresponding first net travels through at least one bonding structure of the integrated circuit.

16. The system of claim 12, wherein the system is further caused to assign each of the plurality of second nets into the second category based on identifying that the corresponding second net is not coupled to any bonding structure of the integrated circuit.

17. The system of claim 12, wherein each of the plurality of first nets in the first category travels through at least one of the following structures of the integrated circuit: a power rail structure, an input/output pin structure, or a through-silicon-via structure.

18. A non-transitory computer readable medium comprising computer executable instructions for carrying out a method for analyzing an integrated circuit, the method comprising:
    receiving a layout configured for physically forming an integrated circuit;
    identifying a plurality of nets of the formed integrated circuit;
    grouping the plurality of nets into a first category and a second category based on the layout of the integrated circuit, wherein the first category includes a plurality of first nets that each serve as a power net or an input/output net of the integrated circuit, and the second category includes a plurality of second nets that each serve as a signal net of the integrated circuit;
    estimating respective first thermal conductivities of a plurality of first grid units disposed along the plurality of first nets;
    estimating respective second thermal conductivities of a plurality of second grid units disposed along the plurality of second nets;
    estimating an equivalent thermal conductivity of the integrated circuit based on the first thermal conductivities and the second thermal conductivities; and
    performing a thermal analysis on the integrated circuit based on the equivalent thermal conductivity.

19. The non-transitory computer readable medium of claim 18, the method for analyzing the integrated circuit further comprising:
    constructing each of the plurality of first nets with corresponding ones of the plurality of first grid units;

estimating a metal density of each of the corresponding first grid units; and multiplying the metal density by a thermal conductivity of a bulk metal material to estimate the first thermal conductivity of the corresponding first grid unit.

20. The non-transitory computer readable medium of claim 18, the method for analyzing the integrated circuit further comprising:

constructing each of the plurality of second nets with corresponding ones of the plurality of second grid units; and identifying a respective type of each of the corresponding second grid units to determine the second thermal conductivity, wherein the type includes: a first type, including a first dielectric material, that is associated with a lowest combined thermal conductivity; a second type, including a half of a second dielectric material and a half of a first metal material, that is associated with a medium combined thermal conductivity; and a third type, including a third metal material, that is associated with a highest combined thermal conductivity.

\* \* \* \* \*